July 15, 1941.　　　　T. A. RICH　　　　2,249,496
MEASUREMENT OF VOLT AMPERES
Filed Dec. 30, 1939　　　2 Sheets-Sheet 1
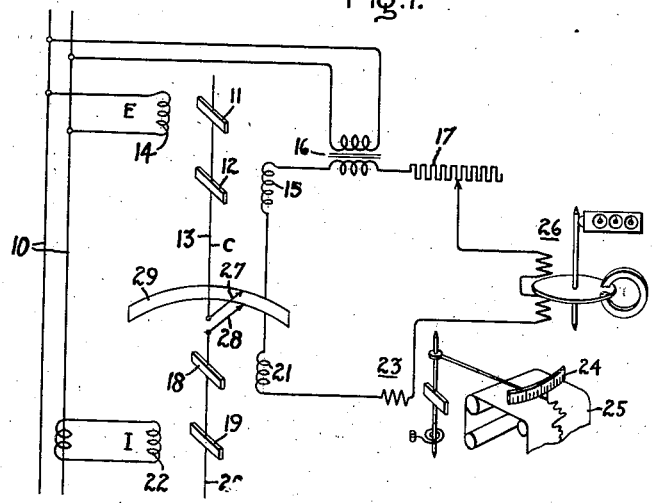
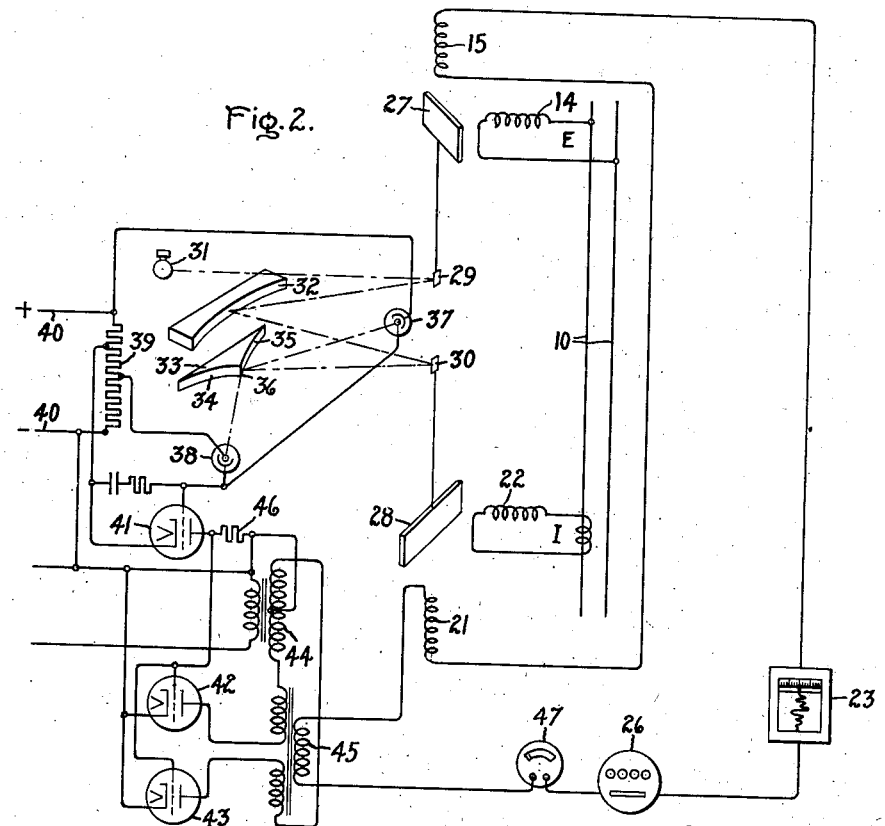
Inventor:
Theodore A. Rich,
by Harry E. Dunham
His Attorney.

July 15, 1941.　　　T. A. RICH　　　2,249,496
MEASUREMENT OF VOLT AMPERES
Filed Dec. 30, 1939　　　2 Sheets-Sheet 2

Inventor:
Theodore A. Rich,
by Harry E. Dunham
His Attorney.

Patented July 15, 1941

2,249,496

UNITED STATES PATENT OFFICE 2,249,496

MEASUREMENT OF VOLT AMPERES

Theodore A. Rich, Schenectady, N. Y., assignor to General Electric Company, a corporation of New York Application December 30, 1939, Serial No. 312,673

6 Claims. (Cl. 171—34)

My invention relates to a method and apparatus for the measurement of volt amperes and volt-ampere hours of alternating current circuits. According to my invention this involves a scheme of obtaining a product of volts and amperes independently of the phase angle between them.

My invention is based on the mathematical fact that if there are two variables such as current I and voltage E whose product is desired, the product may be found by measurement of a third variable C such that $E/C=C/I$. Then $EI=C^2$. The advantage of the introduction of the new variable C is that it permits a product to be found by forming two ratios, and ratios are readily measured by known methods.

Figure 3:
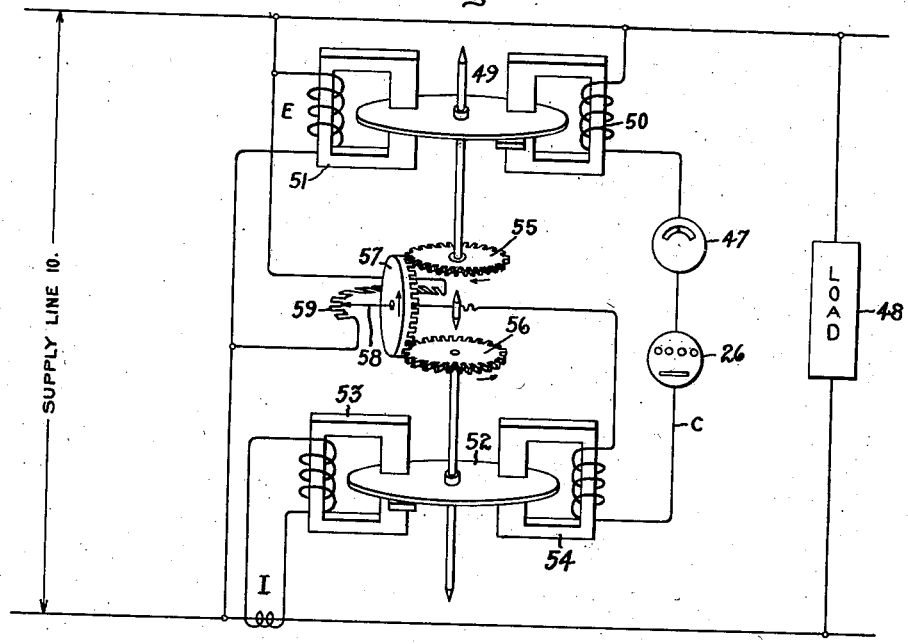
Figure 4:
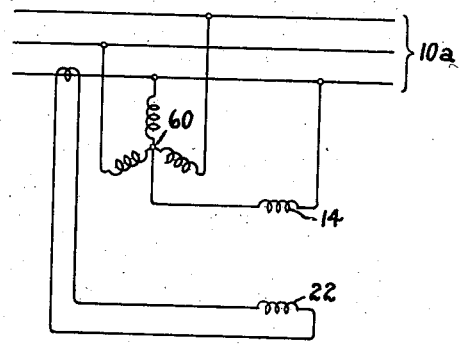

The features of my invention which are believed to be novel and patentable will be pointed out in the claims appended hereto. For a better understanding of my invention reference is made to the accompanying drawings in which Fig. 1 represents a simplified embodiment of my invention including two electrical ratio meters of the magnetic vane armature type for measuring the ratios $E/C$ and $C/I$ referred to above and a circuit for adjusting and measuring the value of C; Fig. 2 represents apparatus in principle like that of Fig. 1 but in which the adjustment of the variable C is obtained automatically; Fig. 3 represents apparatus for carrying out the invention automatically in which ratio meters of the induction disk type are employed; and Fig. 4 represents connections that may be used where it is desired to measure the volt amperes of a balanced three phase alternating current circuit.

Referring now to Fig. 1, 10 represents a single phase alternating current circuit in which it is desired to measure the volt amperes or volt-ampere hours. 11 and 12 represent iron vane armature members on a shaft 13 of a ratio instrument. 14 represents a stationary coil influencing vane 11 and 15 represents a stationary coil influencing vane 12. Coil 14 is energized from the source 10 in accordance with its voltage E. Coil 15 is energized through a variable impedance device 17 for the purpose of obtaining a current proportional to C. A second ratio instrument having vanes 18 and 19 on shaft 20 with energizing coils 21 and 22 is provided. Coil 22 is energized in proportion to the current I of the power circuit 10 and coil 21 is included in the series circuit with coil 15 of the first mentioned ratio instrument and is therefore energized by a current which I have designated C. The upper ratio instrument is arranged to measure the ratio $E/C$ and the lower ratio instrument is arranged to measure the ratio $C/I$. If now the value of C be adjusted as by the variable impedance 17 until $E/C=C/I$, and this relation is maintained, then $EI=C^2$. $C^2$ may be measured by an alternating current ammeter represented at 23 and the result indicated on a scale 24 or recorded on chart 25 in terms of volt amperes. Likewise the current C may be integrated by an induction ampere-squared hour meter represented at 26 in terms of ampere hours. To facilitate comparison of the readings of the two ratio instruments and to facilitate maintaining their ratio readings equal, the instruments may be provided with pointers 27 and 28 reading on the same scale 29. In such a case the two instruments must be designed or adjusted to have similar deflection characteristics at all points of the scale.

This measurement scheme does not interfere with the use of potential and current transformers or the use of different numbers of coil turns on the two ratio instruments, nor does the adjustment of the C current to obtain equal ratio measurements involve any difficulty.

Let us assume that the instruments are energized in response to a line voltage of 100 and a current of 10 amperes=1000 v. a. The C current is then adjusted until both ratio instruments read the same. C is then equal to $\sqrt{EI}=31.5$ multiplied by the calibration constant K of the system. The measuring devices in the C circuit are calibrated accordingly. I. e., under the conditions assumed, instrument 24 indicates 1000 volt amperes. Now assume the current I increases to 20 amperes. The pointer 28 of the lower ratio instrument moves lower on the scale. The C current is now increased which causes pointer 27 to move downscale and pointer 28 to move upscale until the ratios are again equal. The C current is now $K\sqrt{100\times20}=K44.8$ and the instrument scale is marked to indicate 2000 volt amperes. Now, assume the voltage and current changes to 80 volts and 25 amperes, this also gives 2000 volt amperes and the C current will be the same. Both instrument pointers 27 and 28 will move downscale but their indications will remain equal and no adjustment of the C current will be necessary.

I prefer to use the line 10 as the source of supply for the C current since then the C current will drop to zero as it should in case power goes off line 10.

The apparatus of Fig. 1 is shown as arranged for manual adjustment of the C current and comparison of the two ratio readings by the human eye. In Fig. 2 I have illustrated apparatus where these functions are performed automatically. Also in Fig. 2 I have represented ratio instruments where the two coils act upon the same armature member. The principle of measurement is otherwise the same as in Fig. 1. The instrument which measures the value $E/C$ has an iron vane armature 27 cooperating with the E coil 14 and the C coil 15 such that armature 27 turns counterclockwise for an increase in the ratio $E/C$. The instrument which measures the value $C/I$ has an iron vane armature 28 and cooperates with the C coil 21 and the I coil 22 such that for an increase in the ratio C/I the armature 28 turns counterclockwise.

The shafts of the two ratio instruments are in alignment and carry mirrors 29 and 30 in such positions as to cooperate with a light-sensitive control system consisting of a light source 31, a mirror 32 forming a segment of a spherical surface, a mirror support 33 having concave mirror surfaces 34 and 35 intersecting in an edge 36, and light sensitive cells 37 and 38. The mirror 32 is so shaped and positioned that light from source 31 is reflected by mirror 29 to mirror 32 and back to mirror 30 for any angular position of mirror 29. Mirror surface 35 is so shaped and positioned that if the light ray reflected from mirror 30 strikes this surface it is reflected to photo-sensitive device 37, whereas if it strikes surface 34 it is reflected to light-sensitive device 38. The light ray from mirror 30 strikes either surface 35 or 34 and may be divided by partially striking both at the edge 36. It is evident that the position at which the light ray from mirror 30 strikes along the surfaces 34, 36, 35 depends upon the angular position of both ratio instruments. As represented in Fig. 2 the light ray from mirror 30 is split by the edge 36 and partially reflected to both light sensitive cells and this is the normal control condition of the apparatus, although the division of light may vary and the mirrors 29 and 30 may be turned appreciably from the positions represented. It is evident that to keep the light ray on the edge 36, mirror 30 must be turned counter-clockwise if mirror 29 is turned counter-clockwise because if the light ray strikes 32 further to the left and mirror 30 does not move, it reflects the light further to the right on surface 35. The photo cells 37 and 38 are connected in series across a suitable part of a voltage divider resistance 39 energized from a direct current source 40 as represented.

The distribution of the light on cells 37 and 38 controls the bias on the grid of a three-electrode vacuum tube 41 which has its filament and plate connected across a suitable part of the resistance divider 39 with the plate more positive than the filament. It is seen that when light falls only on photo cell 38 tube 41 is made highly conducting and when light falls only on photo cell 37 tube 41 is made non-conducting, and that for light distributions on both cells the tube 41 passes current in proportion to the ratio of light falling on cell 38 as compared to that falling on cell 37.

The conductivity of tube 41 in turn controls the conductivity of a pair of three electrode vacuum tubes 42 and 43 supplied from a transformer 44 energized from source 10. The plate circuits of tubes 42 and 43 feed a transformer 45 which supplied the C current for coils 15 and 21 of the ratio instruments. The filament and grids of rectifier tubes 42 and 43 are connected across a resistance 46 in the plate circuit of tube 41 such that when current flows through tube 41 and resistance 46 the grids of tubes 42 and 43 are negatively biased to reduce the current flow therethrough. Hence tubes 42 and 43 conduct current in inverse ratio to the conductivity of tube 41, and likewise the C current flow in coils 15 and 21 is inversely proportional to the conductivity of tube 41.

Let it be assumed now that the ratio measurements of the two instruments are the same and that the system is balanced in this condition. If, now, E increases and I remains constant, C must increase to rebalance the system. An increase in E causes mirror 29 to turn counter-clockwise. The light ray reflected therefrom moves to the left on mirror 32 and is reflected by mirror 30 more to the right on mirror 35. Photo cell 37 becomes more conducting and photo cell 38 less conducting thereby decreasing the conductivity of tube 41 and increasing the conductivity of tubes 42 and 43 to increase the C current. This causes mirror 29 to rotate clockwise and mirror 30 to rotate counter-clockwise to the extent necessary to rebalance the system and restore the ratios to $E/C = C/I$. In the same way it may be shown that increasing or decreasing changes in either E or I results in automatic restoring of the system to the balanced ratio condition where $C^2$ is proportional to volt amperes. As in Fig. 1 I employ alternating current in the C circuit which makes it easy to measure the $C^2$ current by alternating current instruments or meters in terms of volt amperes or volt ampere hours.

In the C circuit I have represented an indicating volt ampere instrument 47, an integrating volt ampere hour meter 26 and a recording volt ampere meter 23. These may be located any desirable distance from the ratio instruments and control apparatus.

Fig. 3 represents another form of the invention where the ratio balancing action is performed automatically and integrating type induction meter motors are employed operating on a differential regulator. Here speed ratios are compared and equalized. In Fig. 3 the alternating current supply lines 10 supply a load at 48. 49 represents a rotary induction disk of conducting material which is driven by a shaded coil induction motor stator 50 energized in proportion to the C current as will be explained presently. The disk 49 is retarded by a damping magnet 51 energized in proportion to the voltage E of line 10.

At 52 is another rotary induction disk of conducting material driven by a shaded coil induction motor stator 53 energized in proportion to the load current I of line 10 and damped by a damping magnet 54 the energizing coil of which is in series with motor 50 in the C current circuit. The two motor devices rotate in opposite directions and have their shafts connected to drive the opposite sides 55 and 56 of a mechanical differential, the central member 57 of which is thus driven in a direction and by an amount proportional to the difference, if any, in the speeds of the two motor disks 49 and 52. The central member of the differential carries a contact arm 58 arranged to move over a resistance 59 which is connected across line 10. The C circuit is energized through contact arm 58. The differential thus controls a rheostat which is included in the C circuit and energized from line 10 as shown. The direction of rotation of the parts of the differential with respect to the adjustment of the rheostat is made such that a decrease in the speed of meter disk 49 with respect to the speed of meter disk 52 decreases the resistance 59 included in the C circuit. This will increase the C current and increase the speed of disk 49 and decrease the speed of disk 52 until the speeds are again equal.

The speed of disk 49 is proportional to and is a measurement of the ratio C/E and that of disk 52 is proportional to and is a measurement of the ratio I/C. Hence when the speeds are equal $C/E=I/C$ or $EI=C^2$. The arrangement is thus such that the square of the current in the C current is proportional to volt amperes, and this current may be measured or integrated in terms of volt amperes as contemplated by devices such as indicated at 47 and 26. It will be understood that the driving and damping elements of both motor meters may be interchanged to accomplish the same result.

It will be evident that in case the power circuit 10 fails both motor meters will stop and the C current will drop to zero. If there is voltage but no current the C current will be adjusted to a zero value by movement of the rheostat arm 53 first to include maximum resistance in the C circuit, and then to open this circuit. The scheme is thus entirely automatic and correctly responsive to all conditions likely to be encountered as is the case with Figs. 1 and 2.

Where integrated volt amperes only are required, it is not essential that the control of the rheostat of Fig. 3 be very accurate or sensitive so long as the average speeds of parts 55 and 56 are equalized. The control device for the C current may thus be geared down so as to be operated by very small motors and the rheostat itself may take the form of a tap changing resistance that is adjusted intermittently to maintain the average speed of the two meter motor devices equal and the average $C^2$ current proportional to volt amperes.

In Fig. 4, I have represented connections for energizing the voltage coil 14 and the current coil 22 of my ratio instruments from a three-phase alternating current circuit 10a in which the current in the different phases is balanced. In this illustration, 60 represents a Y box having three coils connected in Y to the three phases of the circuit 10a. A voltage representative of the line voltage is taken from the Y point to one of three phase lines. Coils 14 and 22 will then be energized by currents truly proportional to the voltage and current of the three phase circuit and the necessary multiplying factor can be introduced at any point of the measurement system which will otherwise be as previously described.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The method of measuring volt amperes of an alternating current circuit which consists in measuring the ratio of a current proportional to the voltage of the alternating current circuit and an adjustable current, measuring the ratio of the adjustable current and a current proportional to the current of the alternating current circuit, adjusting the adjustable current until the two ratio measurements are equal and then measuring the adjustable current in terms of the volt amperes of the alternating current circuit.

2. The method of measuring the volt ampere hours of an alternating current circuit which consists in continuously measuring the ratio of a current proportional to the voltage of the alternating current circuit and an adjustable current, continuously measuring the ratio of the adjustable current to a current proportional to the current of the alternating current circuit, maintaining the adjustable current at such value that the two ratio measurements are equal and then integrating the adjustable current in terms of the volt ampere hours of the alternating current circuit.

3. Apparatus for measuring volt amperes of an alternating current circuit comprising two current ratio responsive devices, each having two energizing windings and a movable member responsive to the ratio of the energy supplied to the energizing windings, connections for energizing one winding of one device in proportion to the voltage of a alternating current circuit, connections for energizing one winding of the other device in proportion to the current of the same alternating current circuit, means for energizing the other windings of both devices in proportion to a third current, such that said devices respond oppositely to the third current, means for adjusting the value of the third current and means for measuring said third current in terms of the product of volts and amperes of the alternating current circuit.

4. In combination, an alternating current circuit, apparatus for measuring the volt amperes thereof comprising a ratio instrument for measuring the ratio E/C and a second ratio instrument for measuring the ratio C/I where E and I are currents proportional to the volts and amperes of the alternating current circuit supplied to said instrument and C is a variable current, an auxiliary circuit energized from said alternating current circuit and connected to energize both ratio instruments in accordance with the C current, means in said auxiliary circuit for adjusting the value of such current and alternating current measuring apparatus in said auxiliary circuit.

5. In combination, an alternating current circuit, a ratio instrument responding to the ratio E/C and a ratio instrument responding to the ratio C/I where E and I are currents proportional to the voltage and current of said circuit and C is an adjustable current, an auxiliary circuit supplied from said alternating current circuit for supplying the C current to both ratio instruments, automatic means controlled by said ratio instruments for regulating the value of the C current such that $E/C=C/I$, and alternating current measurement means for measuring the C current in terms of the volt amperes of said alternating current circuit.

6. In combination with an alternating current circuit, a pair of induction meter motors each having a driving magnet and a damping magnet, means for energizing the damping magnet of one motor in proportion to the voltage of said circuit, means for energizing the driving magnet of the other motor in proportion to the current of said circuit, and an auxiliary circuit supplied from said alternating current circuit for energizing the remaining magnets of both motors, a differential connected between said motors and responsive to the difference in their speeds, a variable impedance in the auxiliary circuit controlled by said differential so as to maintain the average speeds of said two motors proportional and means for measuring the current in said auxiliary circuit in terms of the volt amperes of the alternating current circuit.

THEODORE A. RICH.